Nov. 1, 1949.   J. T. TRAVERS   2,486,691
APPARATUS FOR PURIFYING SEWAGE AND INDUSTRIAL WASTES
Original Filed Aug. 19, 1940
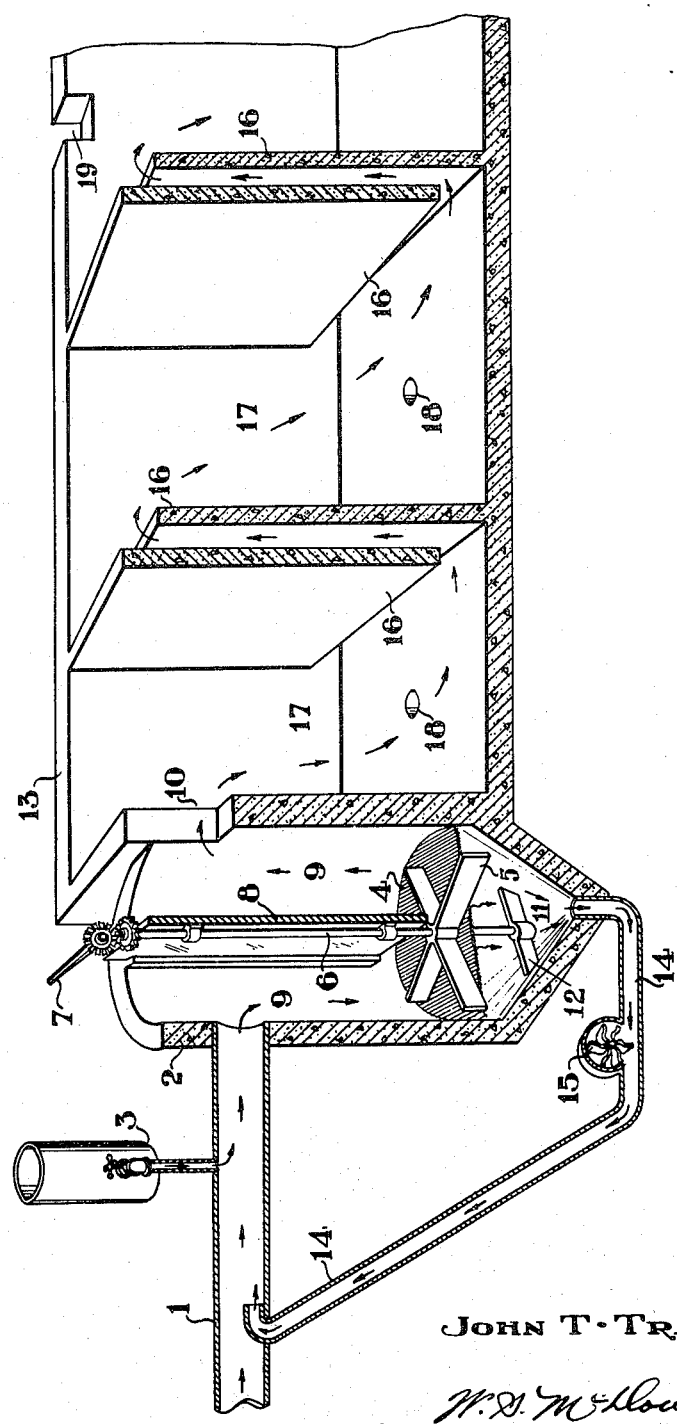
Inventor
JOHN T. TRAVERS
By W. D. McDowell
Attorney Patented Nov. 1, 1949

2,486,691

UNITED STATES PATENT OFFICE 2,486,691

APPARATUS FOR PURIFYING SEWAGE AND INDUSTRIAL WASTES

John T. Travers, deceased, late of Columbus, Ohio, by Mary E. McDonald, administratrix, Columbus, Ohio Substituted for application Serial No. 353,226, filed August 19, 1940. This application filed January 19, 1949, Serial No. 71,662

5 Claims. (Cl. 210—2)

This invention relates to an improved method and apparatus for treating sewage and industrial waste of a liquid character for the purpose of purifying such sewage or waste, eliminating obnoxious odors and producing an effluent which may be discharged into natural streams or other bodies of water without harmful consequences thereto.

This application forms a substitute for prior forfeited application, Serial No. 353,226 filed August 19, 1940, by John T. Travers, now deceased.

In his prior patents, Nos. 1,440,253 and 1,440,254, granted December 26, 1922, he has set forth a system for effecting the purification of sewage and industrial waste with the employment of a treating agent composed primarily of marl.

It is an object of the present invention to further improve the process and apparatus set forth in his aforesaid patents particularly by way of rendering the treating agent more effective, in reducing the quantity of the treating agent necessary to neutralize a given amount of the sewage or waste and render the system more economical and effective in operation.

The use of marl (calcium carbonate) in the treatment of many different types of industrial waste and domestic sewage, discloses that said compound is unusually effective even while the fluids undergoing treatment are in an advanced state of decomposition. With the use of marl, such odors are substantially instantaneously destroyed and no offensive odors can be detected around the treating plant. For instance, all odors characteristic of sewage in a state of decomposition and containing or releasing indole, skatole, mercaptans, putrecine, cadaverine and hydrogen sulphide are subdued or destroyed.

Also, the sludge comprising solids precipitated out of the sewage, does not possess a disagreeable odor and will not putrefy, thus making it a desirable fertilizer or filler for commercial fertilizer of certain economic value. The particular effectiveness of marl as a treating agent in the capacities indicated is considered to be due to the fact that it contains calcium iodate. Marl is composed of from 82% to 98% calcium carbonate. The calcium iodate (salt of calcium carbonate) is bound up in calcium carbonate but is not available except under conditions where it can be brought into direct contact with putrescible organic matter. Calcium iodate has been found to contain 51% iodine and 16% oxygen, all of which is available for sewage neutralization when properly released, the compound being liberated in the presence of putrescent organic matter. When calcium iodate is placed in a slightly alkaline solution containing organic matter, it decomposes, liberating iodine and oxygen and the iodine may be slowly reformed to the iodate stage by the decomposition of water. The iodate so reformed, when in contact with another portion of putrescible organic matter, yields further proportions of free iodine and oxygen to again serve as previously set forth.

In accordance with the present invention, he recognized the presence and value in marl of calcium iodate and provided for the more efficient utilization of this treating agent for the purpose of securing improved treatment of the industrial waste or sewage handled by his system and at the same time to minimize operating costs.

Heretofore, in the commercial utilization of the systems disclosed in his aforesaid patents, using marl as a purification agent, to neutralize and/or purify the sewage or other wastes, practice disclosed it necessary to use an excess of the marl mixture to obtain desired results. For instance, he ordinarily employed 6 to 8 pounds of the marl mixture to one thousand gallons of sewage treated. In rapidly flowing the sewage with marl admixed therewith through a treatment tank, 15% to 20% of the marl dissolves in the sewage, reacting in a very energetic manner while it is in contact with raw sewage. However, about 80% of the marl drops by gravity to the bottom of the treatment tank, where it no longer contacts with raw incoming sewage, thereby becoming ineffective because it has no opportunity to dissolve and, heretofore, this excess marl was wasted.

In accordance with the present invention, he has found that by installing a pump in a pipe line leading from the point of accumulation of the marl sediment that a part of this unused marl may be returned to the system by a recycling operation in which the unused and undissolved marl may again be brought into contact with the incoming sewage or other fluids of industrial waste and operated thereon with the same effectiveness, or in some instances, increased effectiveness, as regards unused marl. By this system of recycling the marl from the bottom of the treatment tank to the incoming sewage line, he not only uses less of the purifying agent, but reduces the costs of operation, increases the effectiveness of the system and provides operating economies.

For a further understanding of the invention, reference is to be had to the following description and the accompanying drawing, wherein:

The figure is a vertical longitudinal sectional view, partly in perspective, of apparatus which may be used in carrying out the present invention.

Referring more particularly to the drawing, the numeral 1 designates a pipe line, conduit or other enclosed passage through which raw sewage or the many different types of industrial wastes, may be fed to the system for treatment. The discharge end of the pipe 1 terminates in the upper end of a tank 2. Communicating with the pipe line or conduit 1, in advance of the tank 2, is a feeder 3 by means of which marl in regulated quantities may be introduced into the fluids passing through the pipe or conduit 1 to the tank 2. As a purifying or treating agent, he may use marl alone or marl in various combinations with other compounds such as hydrated lime or ferrous sulphate, this being controlled largely by the character of the wastes to be treated. Marl, however, is the primary constituent. By way of example, he has employed a treating compound composed of the following:

|  | Per cent |
|---|---|
| Hydrated lime | 20 |
| Ferrous sulphate | 7.5 |
| Marl | 72.5 |

However, for the purpose of the present specification, the purifying agent will be referred to as marl, since it is the essential treating agent of his process, and where the word is used, either in the specification or claims, it should be understood that the same is intended to mean either marl alone or in combination with other added compounds.

Arranged in the tank 2, toward the bottom thereof, is a horizontally disposed screen 4 and mounted immediately above this screen is a rotary agitator 5, the latter being carried by a vertical shaft 6 suitably journaled in the tank, the shaft being driven by a motor or its equivalent 7. Placed vertically in the tank 2 is a baffle wall 8, the lower edge of which terminates immediately above the agitator 5, the wall 8 being spaced from the adjacent wall of the tank 2 in order to provide a restricted passage 9 through which the fluids undergoing treatment are passed in a generally upward direction toward the outlet 10 in the top of the tank.

Marl, since it is comparatively heavy, possessing substantially the weight of sand, settles in part on the screen 4 and passes through the openings of the screen into a marl trap 11, located in the bottom of the tank 2. If desired, the shaft 6 may be extended through the screen and be equipped with a second agitator 12, whereby to maintain the marl deposited in the trap by gravity in a state of agitation or motion. A certain proportion of the total quantity of marl used in the process is caught by the trap 11, while the rest of the marl is entrained in the fluids undergoing treatment, and passes upwardly through the passage 9 with said fluids and is discharged from the tank by way of the outlet 10, entering an enlarged treating and settling vessel 13, hereinafter described. A particular feature of the present invention resides in joining with the bottom of the trap 11 a pipe line 14, the latter leading from said trap to the sewage conduit 1, a pump or other equivalent means 15 being arranged in the pipe line 14 for the purpose of effecting a forced and positive flow of the marl from said trap into contact with the incoming sewage entering the agitator tank. By this means, the undissolved calcium iodate contained in the marl will again become effective in sewage neutralization, since it comes into intimate contact with the decomposed or decomposing organic substances of the waste or sewage, liberating iodine and oxygen and energetically attacking the sewage. It is believed that in the operation of the system, there is some re-forming at least of the thus liberated iodine and oxygen to the iodate stage, and such re-formed compounds may of course be again trapped in the bottom of the tank 2, together with the marl which has not been dissolved in or carried off by the sewage delivered to the vessel 13. This system enables a large quantity of marl to be used very economically and overcomes one of the practical objections heretofore noted in the treatment of sewage with marl. It is well recognized that the system is highly effective, but the treating costs have been relatively high, since to obtain best results, the use of a large amount of marl has been necessary. He has found that by extracting about 25% of the marl delivered to the system from the trap 11 and recirculating the same, smaller quantities of marl may be used and at the same time the efficiency of the system in purifying waste and sewage obtained.

The marl, in practice, is applied to the rapidly flowing raw sewage as it enters the agitator tank. The raw sewage contains considerable quantities of carbonic acid, which reacts on the marl and quickly dissolves it in part. However, just the instant the sewage with which the marl has been in contact is purified, reaction stops until the undissolved marl is again brought into contact with additional quantities of putrifying organic matter. In the meantime, the undissolved marl drops into the bottom of the agitator tank, where it ordinarily no longer comes in contact with putrifying organic matter.

By reason of its weight, intense agitation will not bring the undissolved marl upwardly from the bottom of the tank into contact with the raw incoming sewage. The rapid flow of the sewage through the tank 2 washes the same outwardly into the treatment vessel 13, precipitating the light organic solids (sludge). The vessel 13, or the main treatment tank, is provided at intervals with baffles 16 which form compartments 17. Sludge may be removed from the bottoms of these compartments by way of the valved outlets 18, and the end compartment contains a weir 19 constituting an outlet for a clear, odorless and purified effluent. This effluent may be discharged harmlessly to a sewer or other stream of water without deleterious effects thereon. The sludge withdrawn from the compartment 17 is also odorless and in certain instances, this sludge may be used as a valuable product in the manufacture of fertilizers. In the trap 11, nothing collects but the purifying agent, the latter being substantially free of the organic solids of the fluids undergoing treatment. Thus the sludge or coagulated organic matter is separated from the undissolved marl, and it is this marl alone, and not the sludge, which is returned to the system for recirculation therein.

What is claimed is:

1. Apparatus for treating and purifying untreated and unsettled polluted waste liquids comprising an agitator tank, a conduit for carrying waste liquids entering said tank, means for introducing regulated quantities of a purifying agent into the waste liquids passing through said conduit, a movable agitator in said tank, a trap provided in the bottom of said tank for the reception of the undissolved portions of said purifying agent, means for conducting the undissolved purifying agent from said trap to said conduit for further contact with untreated waste liquids, a baffle arranged within said tank above said agitator and producing an outlet passage for said liquid, and an outlet communicating with the upper end of said passage through which liquid is discharged from said tank.

2. Apparatus for treating and purifying previously untreated polluted waste liquids comprising an agitator tank, a conduit for carrying waste liquids entering said tank, means for introducing regulated quantities of a purifying agent into the waste liquids passing through said conduit, a rotary power driven agitator in said tank, a screen arranged below said agitator and forming a trap in the bottom of said tank for the reception of undissolved portions of said purifying agent, means for conducting the purifying agent in a substantially sludge-free state from said trap to said conduit for further contact with untreated waste liquids, a baffle arranged within said tank above said screen and agitator and producing an outlet passage for said liquid, and an outlet communicating with the upper end of said passage through which liquid is discharged from said tank.

3. Apparatus for treating and purifying previously untreated polluted waste liquids comprising an agitator tank, a conduit for carrying waste liquids entering said tank, means for introducing regulated quantities of a purifying agent into the waste liquids passing through said conduit, a movable agitator in said tank, a screen arranged below said agitator and forming a trap for the reception of undissolved portions of said purifying agent, means for conducting the purifying agent in a substantially sludge-free state from said trap to said conduit for further contact with untreated waste liquids, a baffle arranged within said tank above said agitator and trap and producing an outlet passage for said liquid, an outlet communicating with the upper end of said passage through which liquid is discharged from said tank, and an enlarged sludge precipitating and settling tank adapted for the reception of liquids discharged from said outlet.

4. Apparatus for removing impurities from waste liquids, comprising a tank formed at one end with a mixing chamber, an inlet entering the upper part of said chamber at one side thereof for introducing untreated waste liquids therein, means for introducing regulated quantities of a purifying agent into said liquids, said means being located so that said purifying agent will be present in desired proportions in the liquids disposed in said chamber, an outlet for the liquids leading from said chamber on the opposite side of the latter and at approximately the same level as said inlet, a vertical divisional wall arranged in said chamber and separating the latter into a fluid inlet compartment communicating with said inlet and in which compartment the flow of liquid is generally downward and an outlet compartment in which the flow of liquid is generally upward toward said outlet, said wall being spaced from the bottom of said chamber to provide fluid flow communication between the lower ends of said compartments, a movable agitator arranged below said wall for rotation in a horizontal plane, a foraminated member disposed beneath said agitator, the lower part of said chamber beneath said foraminated member being formed to constitute a sump for the trapping of excess quantities of said purifying agent, means for withdrawing the agent trapped in said sump and conducting the same to said inlet for repassage through said mixing chamber, and an enlarged sludge-precipitating and settling tank in communication with said outlet.

5. Continuous flow apparatus for removing impurities from waste liquids as defined in claim 4, and wherein the enlarged sludge-precipitating and settling tank is formed at one end remote from said mixing chamber with an outlet for the removal of the clarified effluent, in combination with means in the bottom of said settling tank for the separate discharge of precipitated sludges.

MARY E. McDONALD,
*Administratrix of the Estate of John T. Travers, Deceased.*

REFERENCES CITED

The following references are of record in the file of this patent:

UNITED STATES PATENTS

| Number | Name | Date |
|---|---|---|
| 389,479 | Lortzing | Sept. 11, 1888 |
| 910,327 | Sutro et al. | Jan. 19, 1909 |
| 1,194,000 | Dobyns et al. | Aug. 8, 1916 |
| 1,362,611 | Ellms | Dec. 21, 1920 |
| 1,440,253 | Travers | Dec. 26, 1922 |
| 1,440,254 | Travers | Dec. 26, 1922 |
| 1,520,399 | Blumenthal | Dec. 23, 1924 |
| 1,577,176 | Connet | Mar. 16, 1926 |
| 1,752,795 | Hoover et al. | Apr. 1, 1930 |
| 1,915,240 | Putnam | June 20, 1933 |
| 1,956,420 | Gleason et al. | Apr. 24, 1934 |
| 2,065,123 | Downes | Dec. 22, 1936 |
| 2,074,082 | Domogalla | Mar. 16, 1937 |
| 2,111,097 | Green et al. | Mar. 15, 1938 |
| 2,116,053 | Urbain et al. | May 3, 1938 |
| 2,128,393 | Allen | Aug. 30, 1938 |
| 2,137,966 | Rankin | Nov. 22, 1938 |
| 2,179,246 | Applebaum | Nov. 7, 1939 |
| 2,204,703 | Sanders | June 18, 1940 |
| 2,211,565 | Hawley | Aug. 13, 1940 |
| 2,223,634 | Morton | Dec. 3, 1940 |